(12) United States Patent
Suzuki et al.

(10) Patent No.: US 7,699,704 B2
(45) Date of Patent: Apr. 20, 2010

(54) GAME SYSTEM PLAYABLE BY PLURALITY OF PLAYERS, GAME APPARATUS AND STORAGE MEDIUM STORING GAME PROGRAM

(75) Inventors: Toshiaki Suzuki, Kyoto (JP); Taiju Suzuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 675 days.

(21) Appl. No.: 10/989,454

(22) Filed: Nov. 17, 2004

(65) Prior Publication Data

US 2005/0119053 A1    Jun. 2, 2005

(30) Foreign Application Priority Data

Nov. 28, 2003    (JP) .............................. 2003-398958

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/30; 463/35; 463/40
(58) Field of Classification Search ................... 463/32, 463/43, 44
See application file for complete search history.

(56) References Cited

U.S. PATENT DOCUMENTS 5,556,107 A * 9/1996 Carter .......................... 463/35
6,996,837 B1 * 2/2006 Miura et al. .................. 725/78
7,037,197 B2 * 5/2006 Watanabe ..................... 463/30
2002/0165028 A1   11/2002 Miyamoto et al.

FOREIGN PATENT DOCUMENTS

| EP | 0 773 699 | 5/1997 |
| JP | 7-265546 | 10/1995 |
| JP | 8-10445 | 1/1996 |
| JP | 11-347250 | 12/1999 |
| JP | 2000-334170 | 12/2000 |
| JP | 2001-300138 | 10/2001 |
| JP | 2002-253848 | 9/2002 |

OTHER PUBLICATIONS

"Buried Treasure—Super Mario Wiki," http://www.mariowiki.com/Buried_Treasure, Created Oct. 23, 2007, Accessed Nov. 2, 2009.*
"Mario Party 4 Nintendo Official Guide Book", first impression of the first edition, Shogakukan Inc., Jan. 1, 2003, pp. 54 to 69.
"The Legend of Zelda Dream Island DX Nintendo Official Guide Book", first impression of the first edition, Mar. 10, 1993, pp. 16 to 17.

* cited by examiner

*Primary Examiner*—Dmitry Suhol
*Assistant Examiner*—Reginald A Renwick
(74) *Attorney, Agent, or Firm*—Nixon & Vanderhye P.C.

(57) ABSTRACT

A game system includes, for example, a game console and a plurality of hand-held game apparatuses functioning as an operating means. In the game system, a game for causing a plurality of player characters simultaneously displayed to find a hidden item in a game field is performed. Then, when a distance between a non-displayed item hidden, which is an object to be found, and the player character comes within the range of the predetermined distance, a notification sound that varies depending on the distance, for example, is output from a speaker of the hand-held game apparatus that operates the player character.

12 Claims, 10 Drawing Sheets

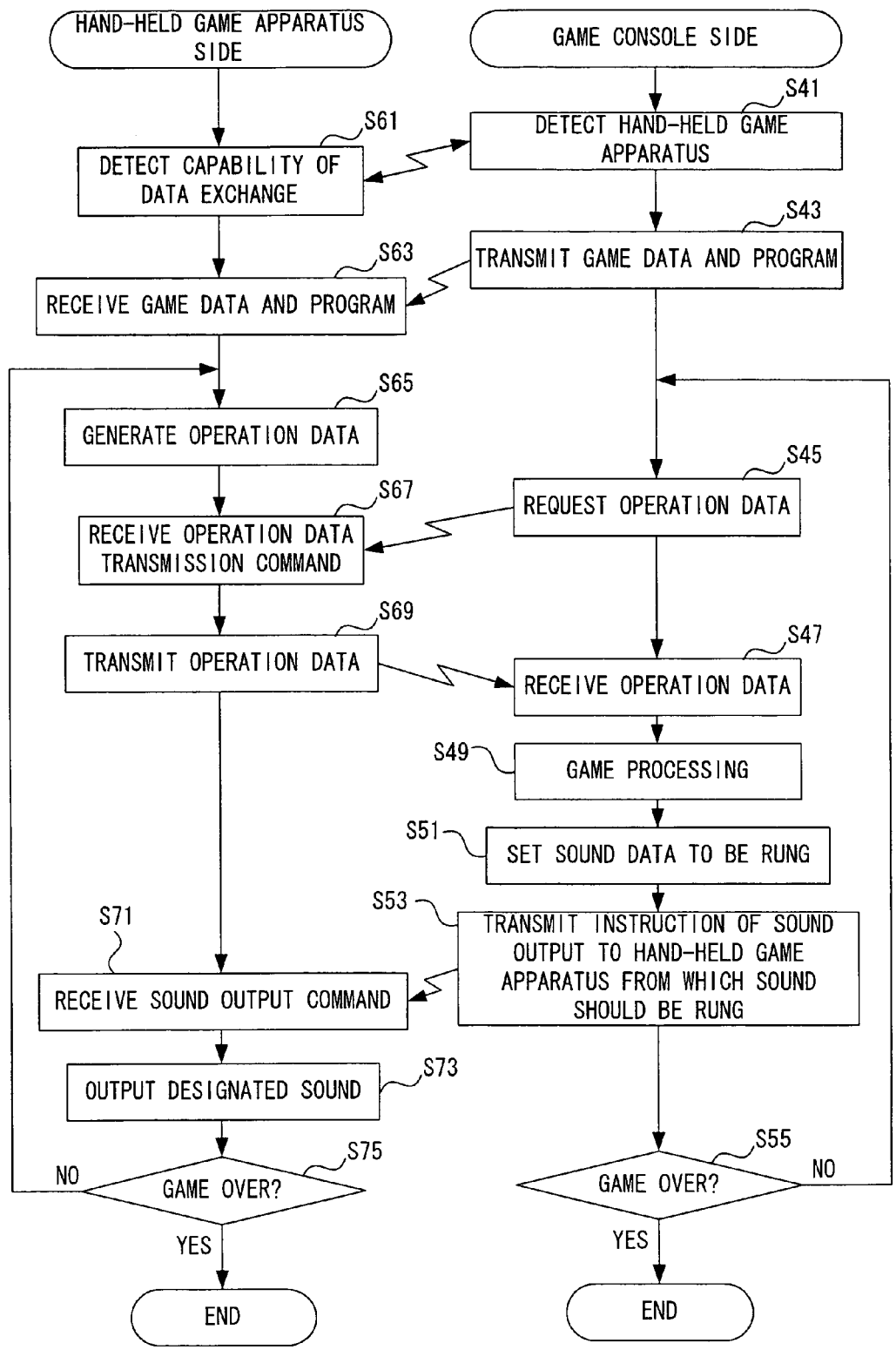

GAME SYSTEM PLAYABLE BY PLURALITY OF PLAYERS, GAME APPARATUS AND STORAGE MEDIUM STORING GAME PROGRAM

FIELD OF THE INVENTION

The exemplary illustrative embodiments herein relate to a game system playable by a plurality of players, a game apparatus, and a storage medium storing a game program. More specifically, the exemplary illustrative embodiments relate to a game system playable by a plurality of players, a game apparatus, and a storage medium storing a game program that allow a plurality of player characters simultaneously displayed to search for a non-displayed item such as a treasure hidden, and not displayed on a screen.

BACKGROUND AND SUMMARY OF THE INVENTION

A game apparatus is known in which, by connecting a plurality of controllers to one game apparatus, a plurality of players can play the same game while simultaneously viewing a common display. "Mario Party 4 Nintendo Official Guide Book" (first impression of the first edition, SHOGAKUKAN Inc., Jan. 1, 2003, page 54 to 69) discloses a number of mini games playable by a plurality of players simultaneously. For example, the game includes a game for causing a character operated by a player to swim faster to finish in first place, and a game for causing players to shoot balls towards a plurality of goals for the basketball to compete for the number of goals made by operating the respective controllers of a plurality of players.

A game for searching for items hidden in the map is also known. In "The Legend of ZELDA Dream Island DX Nintendo Official Guide Book", (first impression of the first edition, Mar. 10, 1993 page 16 to 17), a player searches for various items hidden in the game field to proceed advantageously through the game, or to generate a successive event.

However, in the game described in the first reference, when the plurality of players simultaneously play the game, an emphasis of the game is placed on merely achieving a high score. Therefore, a player who becomes skilled in the game to be played has an advantage, while other players are forced to play an uninteresting game due to the differences in the levels of performance when playing the game with respect to the skilled player. Alternatively, in the game described in the second reference, one goal for obtaining the item is to proceed through the game with an advantage after obtaining it. Thus, even if the game is remade so as to be playable by a plurality of players, an enjoyable game in which a plurality of players hunt for treasure by searching for non-displayed items cannot readily be provided.

Therefore, it is a feature of an exemplary illustrative embodiment to provide a novel game system playable by a plurality of players, a game apparatus, and a storage medium storing a game program.

Another feature of an exemplary illustrative embodiment is to provide a game system playable by a plurality of players, a game apparatus, and a storage medium storing a game program that allows notification of the progress of the game by a sound when a plurality of players search for an invisible non-displayed item, thereby having an influence on the players.

Another feature of an exemplary illustrative embodiment is to provide a game system playable by a plurality of players, a game apparatus, and a storage medium storing a game program, in which while a plurality of players play a game of searching for an invisible non-displayed item, by noting their closeness to the hiding place with a sound that another player can hear, the player whose game apparatus emits a sound can have an enjoyable feeling, knowing that he is about to obtain the non-displayed item, while the other players feel restless, knowing someone is about to obtain the non-displayed item, thereby heating up the game play.

A further feature of an exemplary illustrative embodiment is to provide a game system playable by a plurality of players, a game apparatus, and a storage medium storing a game program, in which the tone of the sound is rendered in common to the game apparatuses, which purposely makes it difficult to know which player is the closest to the hiding place of the non-displayed item (e.g., which player is about to obtain the non-displayed item), thus further instilling a restless feeling and heating up the game play.

Another feature of an exemplary illustrative embodiment is to provide a game system playable by a plurality of players, a game apparatus, and a storage medium storing a game program, in which by changing an output sound depending on the distance between a non-displayed item and a player character, the sound gives a restless feeling or a sense of security caused by being aware of a delay, capable of increasing the enjoyment level and/or a sense of accomplishment.

A game system according to an exemplary illustrative embodiment is a game system playable by the plurality of players provided with a game console including a first display apparatus, and a plurality of hand-held game apparatuses including at least an operating means with which the player plays a game and a sound outputting means, and for searching for an invisible non-displayed item with a plurality of player characters simultaneously displayed. In the game system, the game console further includes a processing means, a first display means, a field generating means, a non-displayed item data storing means, a player position storing means, a distance calculating means, and an instructing means. The processing means performs a game processing in response to an input from the operating means of the plurality of handheld game apparatuses. The first display means displays a result processed by the processing means as an image on the first display apparatus. The field generating means generates a game field where at least one non-displayed item is arranged. The non-displayed item data storing means stores at least a position of the non-displayed item in the game field. The player position storing means temporarily stores positions of the plurality of player characters in the game field that are operated by the plurality of operating means respectively. The distance calculating means calculates a distance between the non-displayed item and the player character on the basis of a position of the non-displayed item and a position of the player character. The instructing means instructs, when the position of the player character falls within a predetermined range from the position of the non-displayed item, the handheld game apparatus operating the player character to emit at least one kind of notification sound on the basis of the distance obtained by the distance calculating means. Then, the sound outputting means of the hand-held game apparatus outputs the notification sound when receiving the instruction by the instructing means.

More specifically, the game system (10) includes one game console (12) and the plurality of hand-held game apparatuses (14) to be connected thereto. The game console includes the first display apparatus (26), and the hand-held game apparatus includes at least the operating means (28) with which the player plays the game, and the sound outputting means (30, 52). In the game system, the plurality of player characters (P1, P2, P3, P4) simultaneously displayed on the first display apparatus search for the invisible non-displayed items (116). The processing means (36) of the game console performs the game processing in response to the input by the operating means from the plurality of hand-held game apparatuses, and the first display means (36, 42) displays the result processed by the processing means as an image on the first display apparatus. The field generating means (36, 64, S5) generates the game field where at least one non-displayed item is an object to be sought is arranged. The non-displayed item data storing means (36, 90) stores at least the position of the non-displayed item in the game field. The player position storing means (36, 72, 86, S9) temporarily stores positions of the plurality of player characters in the game field that are operated by the plurality of operating means respectively. The distance calculating means (36, 74, S11) calculates the distance between the non-displayed item and the player character on the basis of the position of the non-displayed item and the position of the player character. The instructing means (36, 80, S15, S51, S53) instructs, when the position of the player character falls within the predetermined range from the position of the non-displayed item, the hand-held game apparatus that takes charge of the operation of the player character to emit at least one kind of notification sound on the basis of the distance obtained by the distance calculating means. In response thereto, the sound outputting means (46, 108, S73) of the hand-held game apparatus outputs the notification sound when receiving the instruction by the instructing means. Accordingly, depending on the distance between the player character and the non-displayed item, the notification sound can be output, and therefore, the progress of searching the non-displayed item for each player can be notified by sound thereby to exert an influence on the players. For example, the player who is notified can enjoy playing the game with a sense of superiority, while the other players have an irritated feeling. When one kind of common notification sound is output, the players have a more restless feeling because they do not easily know who is about to obtain the non-displayed item.

In one exemplary illustrative embodiment, the instructing means changes the notification sound to be emitted depending on the distance obtained by the distance calculating means. That is, the instructing means (S23, S25) changes the notification sound to be emitted depending on the distance between the player character and the non-displayed item, for example. Accordingly, notified by a different sound depending on the distance, the players who know the distance from the non-displayed item by the changes of the notification sound can alternate between enjoyment and frustration.

In one aspect of an exemplary illustrative embodiment, the game console further includes a non-displayed item displaying means for displaying, after the non-displayed item is found, an image of the non-displayed item on the first display apparatus. That is, the non-displayed item displaying means (36, 42, 76, S27) of the game console displays, after the non-displayed item is found, an image of the non-displayed item on the first display apparatus, for example. Accordingly, as a result of playing the game with a restless feeling from the notification sound, the players can know which player is about to obtain the hidden item only when the hidden item is finally found or obtained, capable of bringing the end of the search to a climax.

In another exemplary illustrative embodiment, the non-displayed item data storing means (92) further stores type data of the non-displayed item. Accordingly, with reference to the attribute data, game processing according to the attribute of the obtained item is executed to thereby develop the game after the non-displayed item is obtained or found in various ways.

A game apparatus according to an exemplary illustrative embodiment is a game apparatus for searching an invisible non-displayed item with a plurality of player characters simultaneously displayed. The game apparatus includes a plurality of operating means, a sound outputting means, a processing means, a first display means, a field generating means, a non-displayed item data storing means, a player position storing means, a distance calculating means, and a notification sound generating means. The sound outputting means is provided to each of the plurality of operating means. The processing means performs a game processing in response to an input from the plurality of operating means. The first display means displays a result processed by the processing means as an image. The field generating means generates a game field where the at least one non-displayed item is arranged. The non-displayed item data storing means stores at least a position of the non-displayed item in the game field. The player position storing means temporarily stores positions of the plurality of player characters in the game field that are operated by the plurality of operating means respectively. The distance calculating means calculates a distance between the non-displayed item and the player character on the basis of a position of the non-displayed item and a position of the player character. The notification sound generating means generates, when the position of the player character falls within a predetermined range from the position of the non-displayed item, at least one kind of notification sound on the basis of the distance obtained by the distance calculating means. The sound outputting means of the operating means for operating the player character that exists within the predetermined range outputs the notification sound generated by the notification sound generating means.

In one exemplary illustrative embodiment, the notification sound generating means changes the notification sound depending on the distance obtained by the distance calculating means.

In one aspect of an exemplary illustrative embodiment, a game apparatus further includes a non-displayed item displaying means for displaying, after the non-displayed item is found, an image of the non-displayed item on the first display means.

In another exemplary illustrative embodiment, the non-displayed item data storing means further stores type data of the non-displayed item.

A storage medium storing a game program according to an exemplary embodiment is a storage medium storing a game program that causes a game apparatus including a plurality of operating means, a sound outputting means provided to each of the plurality of operating means, a processing means for performing a game processing in response to an input from the plurality of operating means, and a first display means for displaying a result processed by the processing means as an image to function as a game apparatus for searching for an invisible non-displayed item with a plurality of player characters simultaneously displayed. The game program of the storage medium causes the computer of the processing means to execute a field generating step, a non-displayed item data storing step, a player position storing step, a distance calculating step, a notification sound generating step, and a sound outputting step. The field generating step generates a game field where at least one non-displayed item is arranged. The non-displayed item data storing step stores at least a position of the non-displayed item in the game field. The player position storing step temporarily stores positions of the plurality of player characters in the game field that are operated by the plurality of operating means. The distance calculating step calculates a distance between the non-displayed item and the player character on the basis of a position of the non-displayed item and a position of the player character. The notification sound generating step generates, when the position of the player character falls within a predetermined range from the position of the non-displayed item, at least one kind of notification sound on the basis of the distance obtained by the distance calculating step. The sound outputting step causes the sound outputting means of the operating means operating the player character that exists within the predetermined range to output the notification sound generated by the notification sound generating step.

In one exemplary illustrative embodiment, the notification sound generating step changes the notification sound depending on the distance obtained by the distance calculating step.

In one aspect of an exemplary illustrative embodiment, the game program further includes a non-displayed item displaying step for displaying, after the non-displayed item is found, an image of the non-displayed item on the first display means.

In another exemplary illustrative embodiment, the non-displayed item data storing step further stores type data of the non-displayed item.

In the game apparatus and the storage medium storing the game program similar to the above-described exemplary illustrative game systems, the notification sound is output from the sound outputting means of the operating means depending on the distance between the player character and the non-displayed item, and therefore, the progress of the game for each player can be indicated by a sound, capable of exerting an influence on the players.

According to an exemplary illustrative embodiment, the notification sound is output as necessary from the operating means (hand-held game apparatus) depending on the distance between the player character and the non-displayed item, and therefore, the player who is notified can play the game with an enjoyable feeling, knowing that the player character operated by him is close to the non-displayed item. On the other hand, the other players, by hearing the notification sound, are informed that another player is about to obtain the non-displayed item, so they may become very frustrated. Therefore, it becomes possible to perform a heated search for the non-displayed item or hunt for treasure. If one kind of the notification sound is output, the notification sound has a tone commonly used for the respective player characters, and this makes it difficult for the players to know which player is about to obtain the non-displayed item. Therefore, the other players have a more restless feeling, capable of boosting the game play.

Furthermore, if a notification sound emitted from the operating means (e.g., a hand-held game apparatus) is changed depending on the distance between the player character and the non-displayed item, the player who is notified can know the extent to which his player object is close to the non-displayed item, while the other players can know whether another player is close to or far from the non-displayed item. Thus, the notification sound provides direction, allowing the players to alternate between enjoyment and frustration when searching the non-displayed item.

Furthermore, if the image of the non-displayed item is displayed after the non-displayed item is found, the players can know, as a result of playing the game with a restless feeling, which player is about to obtain the non-displayed item only when the non-displayed item is finally found or obtained, capable of bringing the end of the search to a climax.

In addition, if the type or the attribute of the non-displayed item is stored, the development of the game after the non-displayed item is obtained or found can be conceived in various ways, corresponding to the kind, etc., capable of providing a more interesting non-displayed item search game.

BRIEF DESCRIPTION OF THE DRAWINGS

These and other features and advantages will be better and more completely understood by reference to the following detailed description of exemplary illustrative embodiments in conjunction with the drawings of which:

FIG. 10 is a flowchart showing one example of a timing diagram for communication between the game console and the hand-held game apparatus in the game system in FIG. 1 exemplary illustrative embodiment.

DETAILED DESCRIPTION

Figure 1:
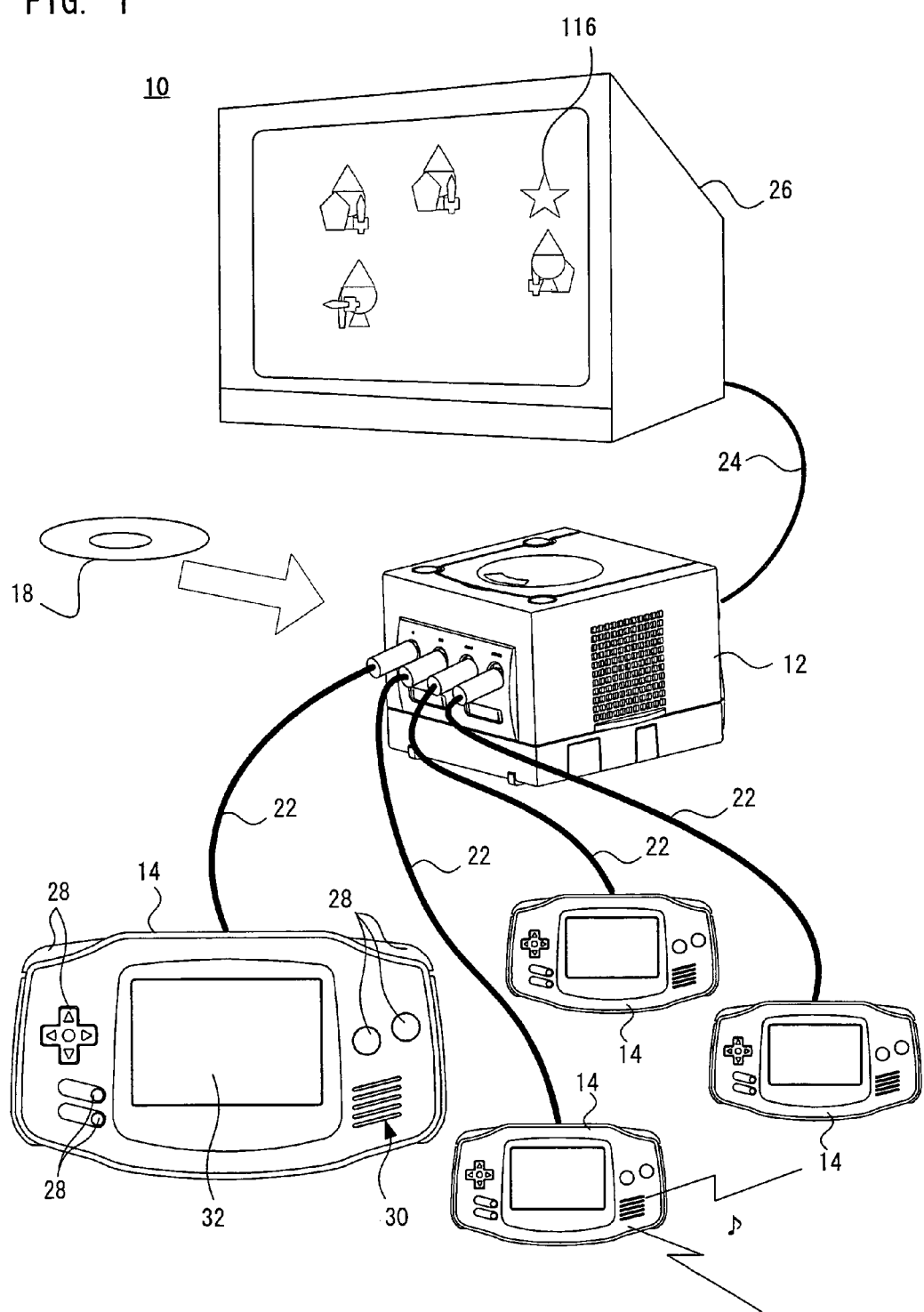
FIG. 1 is shows a game system in accordance with an exemplary illustrative embodiment.

A game system 10 of one exemplary illustrative embodiment shown in FIG. 1 is for playing a game wherein a plurality of players search for an invisible non-displayed item like a hunt for treasure, and includes one game console (fixed-type game apparatus) 12 and a plurality of hand-held game apparatuses 14 (four in this exemplary illustrative embodiment).

Figure 2:
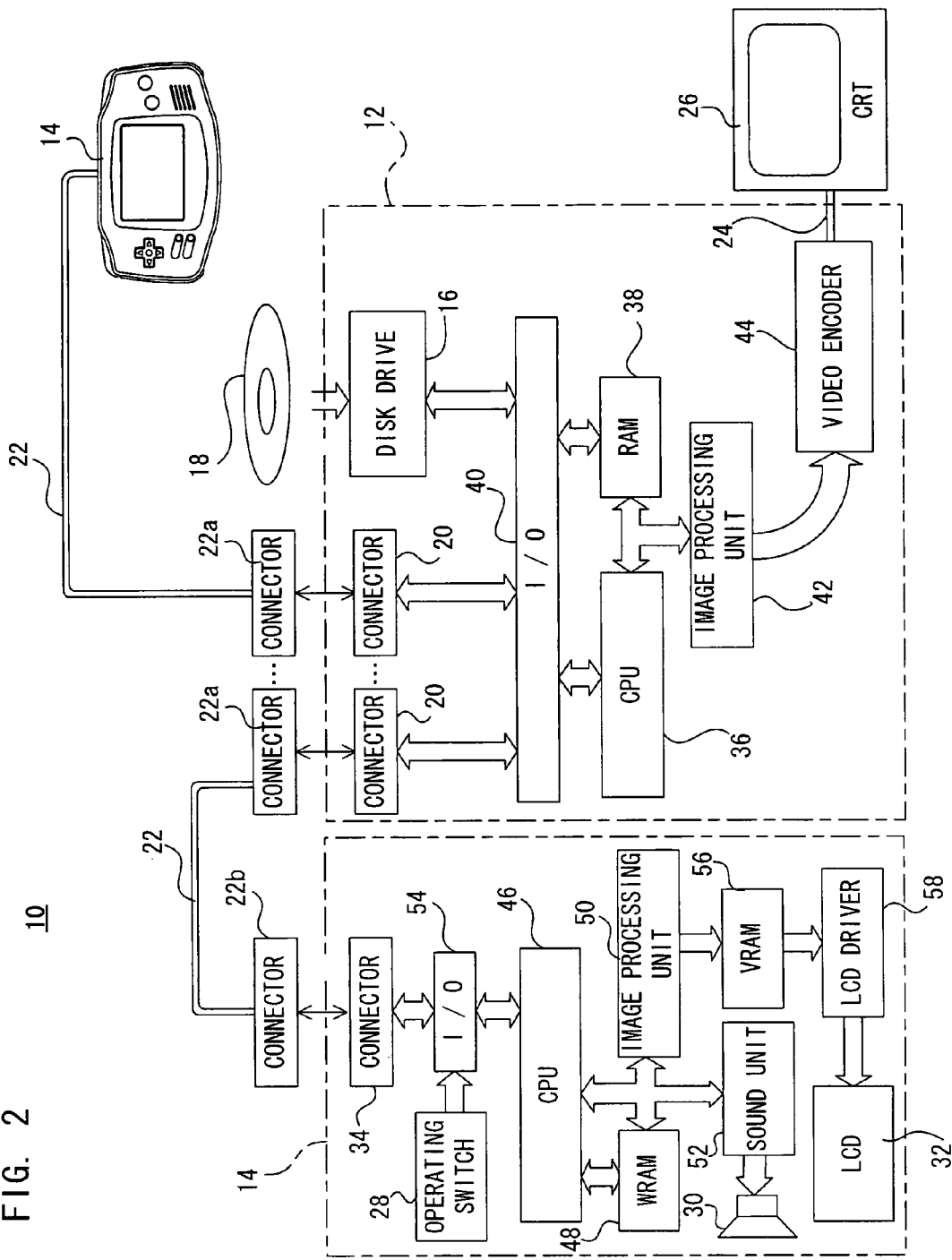
FIG. 2 is a block diagram showing an internal configuration of the game system of the FIG. 1 exemplary illustrative embodiment.

The game console 12 is provided with an optical disk drive 16 (FIG. 2) on an upper surface of an approximately cubic housing. An optical disk 18, which is one example of an information storage medium storing a game program and data, is loaded on the optical disk drive 16. The housing is provided with a plurality of connectors 20 (four in this embodiment) on a front surface thereof (FIG. 2). These connectors 20 are connected with a plurality of hand-held game apparatuses 14 by a plurality of connecting cables 22.

Furthermore, the game console 12 is connected with a monitor 26 as a first display apparatus via an AV cable 24. The monitor 26 is typically a color television receiver, and via the AV cable 24, a video signal from the game console 12 is input to a video input terminal of the color television, and a sound signal is applied to a sound input terminal. Accordingly, a game image generated according to the processing of the program is displayed on the screen of the monitor 26, and a game sound such as a game music (BGM), a sound effect, etc. is output from a speaker (not shown). Each player plays a game by operating the operating means (hand-held game apparatus 14) of his own while viewing a common image displayed on the monitor 26.

The hand-held game apparatus 14 is a hand-held type game apparatus having a size capable of being held with both hands, and includes a rectangular-shaped housing. The housing is provided with an operating switch 28 as an operating means to be operated by each player on a front surface thereof. The operating switch 28, for example, includes a direction switch for moving a player character and a cursor during the game, a plurality of action switches for instructing a movement of the character, etc., and a start switch for instructing a start, a suspend, etc. of the game, and so on.

A speaker 30 as a sound outputting means is integrated inside sound-bleeding holes provided on the surface of the housing. As described later, when the player character operated by the hand-held game apparatus 14 is close to the neighborhood of an arrangement position of a hidden non-displayed item, a notification sound is output from the speaker 30. A liquid crystal display (an "LCD") 32 is provided at the approximate center of the housing. Also, a connector 34 (FIG. 2) is provided on the top surface of the housing, and the connector 34 is connected with the connecting cable 22.

FIG. 2 is an internal block diagram showing the game system 10. With reference to FIG. 2, the game console 12 includes a CPU 36. The CPU 36 is called a processor or a computer, and entirely controls the game console 12. The CPU 36 executes game processing according to the game program. The CPU 36 is connected to RAM 38, an input/output interface ("I/O") 40, an image processing unit 42, etc.

The RAM 38 is utilized as a working memory or a buffer memory for CPU 36, and data required at a time of performing the game processing by the CPU 36 is loaded therein. Data generated by the game processing also is temporarily stored therein. The image processing unit 42 processes the data temporarily stored in the RAM 38 on the basis of the instruction by the CPU 36 to generate image data for display. The generated image is displayed on the monitor 26 via a video encoder 44 and the AV cable 24.

The I/O 40 is connected to the disk drive 16. The data of the optical disk 18 is read by the disk drive 16 on the basis of the instruction by the CPU 36, and transferred to the RAM 38 so as to be stored. Furthermore, the I/O 40 is connected with the plurality of connectors 20, and each of the connectors 20 is connected with a connector 22a being one end of the connecting cable 22 for connection with the hand-held game apparatus 14. Data received from the hand-held game apparatus 14 such as operation data, etc. is applied to the CPU 36 via the connector 20 and the I/O 40, and stored in a predetermined area of the RAM 38. Also, transmission data such as a game program, game data, instruction data, etc. directed to the hand-held game apparatus 14 is transmitted from the predetermined area to each hand-held game apparatus 14 via the I/O 40 and to each connector 20 by the CPU 36.

Furthermore, although omitted in FIG. 2, the CPU 36 is also connected to a sound processing unit, etc. The sound processing unit generates sound output data on the basis of an instruction by the CPU 36, and applies it to the speaker of the monitor 26 via the AV cable 24, and whereby, game music, etc. is output from the speaker.

The hand-held game apparatus 14 includes a CPU 46, and the CPU 46 entirely controls the hand-held game apparatus 14. The CPU 46 is connected to a working RAM (hereinafter abbreviated as "WRAM") 48, an image processing unit 50, a sound unit 52, and an input-output interface ("I/O") 54.

The WRAM 48 is utilized as a work memory or a buffer memory for the CPU 46. In the WRAM 48, a game program and data transmitted from the game console 12 is stored, and the CPU 46 executes processing according to the game program. The image processing unit 50 is connected to a video RAM ("VRAM") 56. The image processing unit 50 generates, according to an instruction of the CPU 46, image data for display on the basis of the data temporarily stored in the WRAM 48. The VRAM 56 temporarily stores the image data for display generated by the image processing unit 50. The image data stored in the VRAM 56 is applied to the LCD 32 via an LCD driver 58 so as to be displayed on the LCD 32. The sound unit 52 converts sound data generated by the processing of the CPU 32 into an analog signal to output it as a sound from the speaker 30.

The I/O 54 connects the CPU 46 to the operating switch 28, the connector 34, etc.

The connector 34 is connected to a connector 22b being the other end of the connecting cable 22 that is connected to the game console 12. The CPU 46 receives the data from the operating switch 28 via the I/O 54 so as to use it for the program processing, and transmits to the game console 12 the input data as operation data via the I/O 54 and the connector 34. Also, the transmission data from the game console 12 is applied to the CPU 46 via the connector 34 and the I/O 54 so as to be stored in a predetermined area of the WRAM 48.

Figure 3:
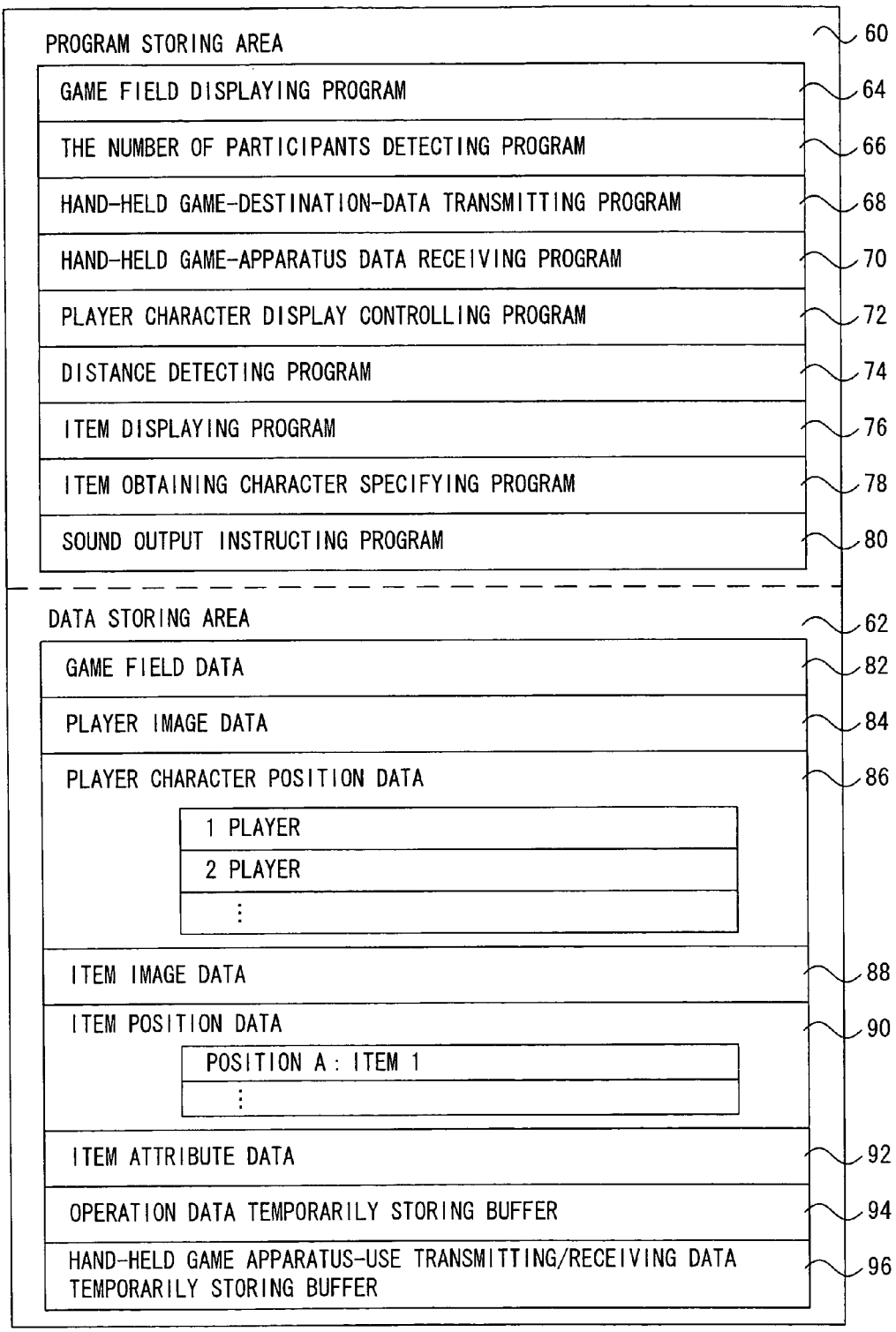
FIG. 3 is an illustrative view showing one example of a memory map of a RAM of a game console in FIG. 2.

FIG. 3 shows one example of a memory map of the RAM 38 of the game console 12. All or a necessary part of the program and data are loaded into the RAM 38 from the optical disk 18 when starting the game or when necessary.

The memory map of the RAM 38 is roughly divided into a program storing area 60 and a data storing area 62. In the program storing area 60, various programs to be executed by the CPU 36 are stored. In the data storing area 62, various data to be utilized by the programs stored in the program storing area 60 are stored. Also, the data storing area 62 is an area for temporarily storing the data generated as a result of the program processing.

The program storing area 60 includes a game field displaying program storing area 64, the number of participants detecting program storing area 66, a hand-held game-destination-data transmitting program storing area 68, a hand-held game apparatus data receiving program storing area 70, a player character display controlling program storing area 72, a distance detecting program storing area 74, an item display program storing area 76, an item obtaining character specifying program storing area 78, a sound output instructing program storing area 80, etc.

In the game field displaying program storing area 64, a program is stored, which generates a game field where a plurality of player characters simultaneously search for the non-displayed item, and displays the image of the game field. In the game field, at least one hidden item which is a non-displayed item is arranged at a predetermined position. The invisible hidden item becomes an object to be sought after.

In the number of participants detecting program storing area 66, a program for detecting the number of the hand-held game apparatuses 14 connected with the game console 12, and detecting the number of the participants in the game is stored.

In the hand-held game-destination-data transmitting program storing area 68, a program for transmitting the data to the hand-held game apparatus 14 is stored. According to this program, for example, a program for making the hand-held game apparatus 14 function as an operating means of the player in the game console 12, a program for outputting a sound from the hand-held game apparatus 14, and so on are transmitted.

In the hand-held game apparatus data receiving program storing area 70, a program for receiving the transmission data including the operation data, etc. transmitted from the hand-held game apparatus 14 is stored.

In the player character display controlling program storing area 72, a program for controlling the actions of the plurality of player characters and displaying these images in the game field is stored. According to this program, a position of each player character is calculated on the basis of the operation data from each hand-held game apparatus 14, and temporarily is stored.

In the distance detecting program storing area 74, a program for calculating a distance between each player character and a hidden item on the basis of a position of each player character and a position of the hidden item is stored.

In the item displaying program storing area 76, a program for displaying, after a hidden item is found, an image of the hidden item at an arrangement position in the game field is stored.

In the item obtaining character specifying program storing area 78, a program for specifying a player character who obtains the hidden item is stored. Furthermore, this program, when the position of the player character and the position of the hidden item have a predetermined relationship (e.g., when the position of the player character reaches a place where the hidden item is obtainable), causes the player character to obtain the hidden item.

In the sound output instructing program storing area 80, a program for transmitting a command for instructing it to output a notification sound to the hand-held game apparatus 14 is stored. According to this program, when the distance between the player character and the hidden item falls within a predetermined range, sound data to be produced is set depending on the distance, and a command for providing an instruction to produce the set sound data is transmitted to the hand-held game apparatus 14 that takes charge of the operation of the player character. Furthermore, according to this program, when the player character obtains the item, the sound data for reproduction when obtaining item is set as the sound data to be produced, and the command for providing the instruction to produce the set sound data is transmitted to the hand-held game apparatus 14 that takes charge of the operation of the player character.

The data storing area 62 includes a game field data area 82, a player image data area 84, a player character position data area 86, an item image data area 88, an item position data area 90, an item attribute data area 92, an operation data temporary storing buffer area 94, and a hand-held game apparatus-use transmitting/receiving data temporary storing buffer 96 area, etc.

In the game field data area 82, data relating to the game field where at least one hidden item is arranged, and where a plurality of player characters simultaneously search for the hidden item, is stored. By use of the data, the game field displaying program generates and displays the game field.

In the player image data area 84, image data for displaying the plurality of player characters is stored. In the player character position data area 86, data relating to positions of the player characters (1 player, 2 player, . . . ) calculated by the character display controlling program on the basis of the operation data, etc are temporarily stored. By use of the position data, the distance detecting program calculates the distance between each player character and a hidden item.

In the item image data area 88, image data of a hidden item to be displayed when it is found is stored. In the item position data area 90, the data relating to the position of each hidden item arranged in the game field is stored. By use of the position data, the distance detecting program calculates the distance between the hidden item and each player character.

In the item attribute data area 92, data relating to type data or an attribute of each hidden item arranged in the game field is stored. As an attribute of the hidden item, for example, money, various items equipped or used by the player character, an extra game for a hand-held game apparatus, etc. are set. For example, if a hidden item whose attribute is the extra game for hand-held game apparatus is obtained, a program relating to the extra game is transmitted to only the hand-held game apparatus 14 of the player who obtains the hidden item, and the extra game is playable in only hand-held game apparatus 14.

In the operation data temporary storing buffer area 94, each operation data transmitted from each hand-held game apparatus 14 is temporarily stored. In the hand-held game apparatus-use transmitting/receiving data temporary storing buffer 96, data to be transmitted to each hand-held game apparatus 14, and data received from each hand-held game apparatus 14 are temporarily stored.

Figure 4:
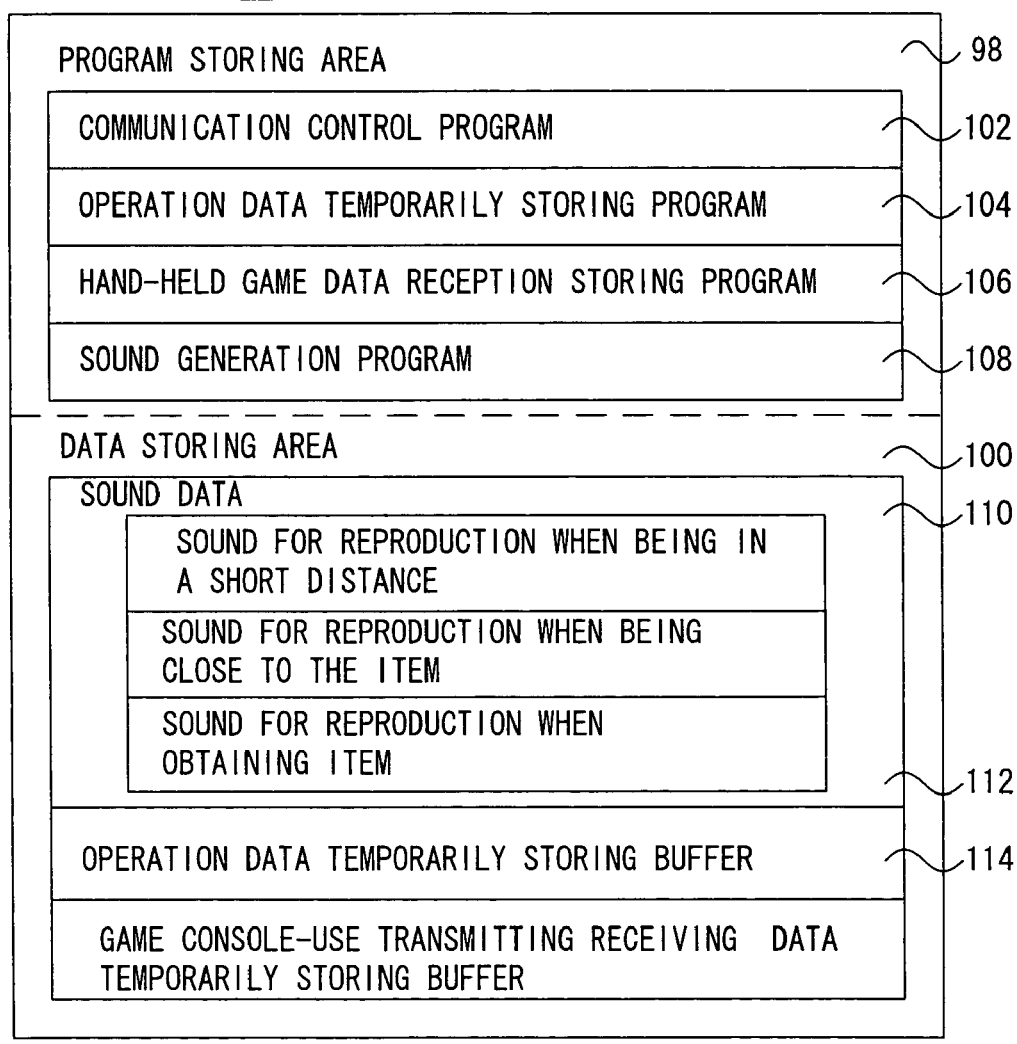
FIG. 4 is an illustrative view showing one example of a memory map of a WRAM of a hand-held game apparatus in FIG. 2.

FIG. 4 shows one example of a memory map of the WRAM 48 of the hand-held game apparatus 14. Into the WRAM 48, programs and data transmitted from the game console 12 when starting the game or when necessary are stored. The memory map of the WRAM 48 includes a program storing area 98 and a data storing area 100. In the program storing area 98, various programs to be executed by the CPU 46 are stored. In the data storing area 100, various data to be used by the programs stored in the program storing area 98 are stored, and data generated by the processing is also temporarily stored.

The program storing area 98 includes a communication control program storing area 102, an operation data temporary storing program storing area 104, a hand-held game data reception storing program storing area 106, a sound generation program storing area 108, etc.

In the communication control program storing area 102, a program for controlling the communication with the game console 12 is stored.

In the operation data temporary storing program storing area 104, a program for temporarily storing input data from the operating switch 28 as the operation data is stored.

In the hand-held game data reception storing program storing area 106, a program for receiving and storing data for a hand-held game transmitted from the game console 12 is stored. According to the program, for example, a program for making the hand-held game apparatus 14 function as the operating means of the player in the game console 12, a program for outputting a sound from the hand-held game apparatus 14, and so on are received.

In the sound generation program storing area 108, a program for generating a sound to be emitted according to a sound output command from the game console 12 and outputting the sound from the speaker 30 is stored.

The data storing area 100 includes a sound data area 110, an operation data temporary storing buffer area 112, and a game console-use transmitting/receiving data temporary storing buffer area 114, etc.

In the sound data area 110, sound data for outputting at least one kind of notification sound is stored. In this exemplary illustrative embodiment, a plurality of sound data differ depending on the distance between where the player character and the hidden item are stored. More specifically, sound data for reproduction when being a short distance away indicates that the player character exists within a short distance range from the hidden item, sound data for reproduction when being close to the item indicates that the player character exists within a nearby range closer to the hidden item than in the short distance case, sound data for reproduction when obtaining the item indicates that the player character obtains the hidden item, etc. are stored. A sound generation program obtains the sound data designated by the command from the game console 12 from the area 110 to thereby generate the sound and output it from the speaker 30. In this exemplary illustrative embodiment, the sound data is commonly used by the respective player characters, and therefore, the notification sound having a tone common to the respective player characters is output.

In the operation data temporary storing buffer area 112, the operation data input from the operating switch 28 is temporarily stored. In the game console-use transmitting/receiving data temporary storing buffer area 114, the data to be transmitted to the game console 12 and the data received from the game console 12 are temporarily stored.

Figure 5:
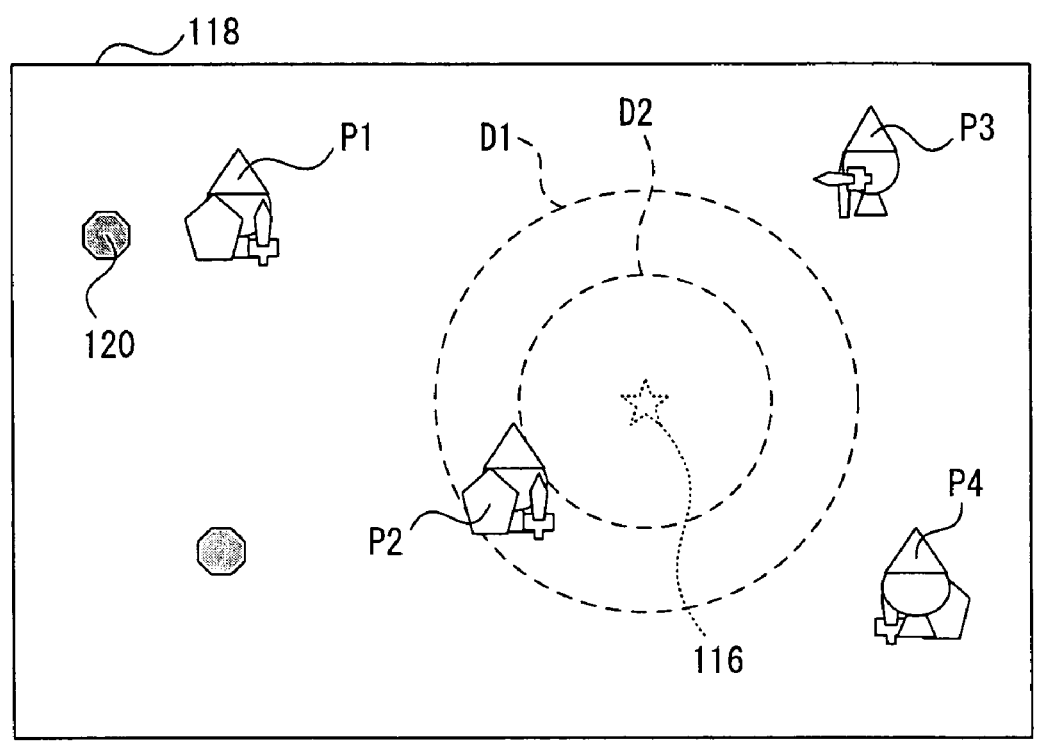
FIG. 5 is an illustrative view showing one example of a display screen and a manner of a sound output for that screen.
Figure 5:
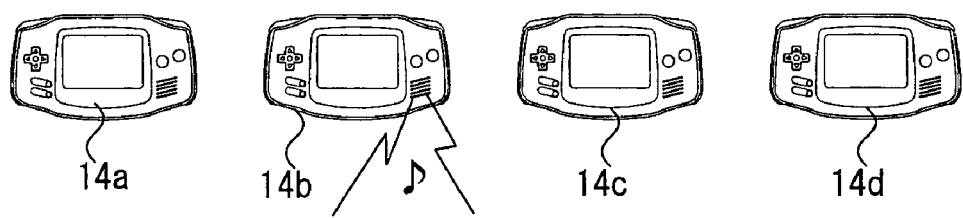

FIG. 5 shows one example of a display screen, and a manner of sound outputs of the respective hand-held game apparatuses 14 at the display screen. With reference to FIG. 5, in the game system 10, a plurality of player characters of P1, P2, P3, P4 (four in this embodiment) are simultaneously displayed, and a game for searching for the hidden item 116 of an object to be found by the player as an invisible non-displayed item is performed. At least one hidden item 116 is hidden at a predetermined position within the game field, and is not displayed on the display screen 118 until it is discovered. It is noted that in FIG. 5, the hidden item 116 is displayed by dotted lines for the sake of convenience.

The plurality of players respectively move the player characters P1, P2, P3, P4 belonging to themselves in an arbitrary direction by operating the operating switches 28 of the respective hand-held game apparatuses 14a, 14b, 14c, 14d, and search the hidden item 116 by digging a hole 120 at an arbitrary place, for example.

Then, in the game system 10, the progress of the search for each player is notified by a sound from the hand-held game apparatus 14 used as the operating means. Specifically, the player character is moved on the basis of the operation data from the hand-held game apparatus 14, and whereby, it is determined whether or not the player character exists within the range of the predetermined distance from the hidden item 116. If the player character exists within the range of the predetermined distance from the hidden item 116, the game console 12 transmits to the hand-held game apparatus 14 that takes charge of the operation of the player character a command for providing an instruction to output a predetermined sound depending on the distance between the player character and the hidden item 116. The hand-held game apparatus 14 outputs the predetermined sound according to the received command.

In the FIG. 5 example, the player character P2 exists within the range of the short distance from the hidden item 116 (the area between the dashed line D1 and dashed line D2 in FIG. 5), and therefore, a notification sound indicative of being a short distance from the hidden item 116 is output from the speaker 30 of the hand-held game apparatus 14b that takes charge of operating the player character P2.

The player who hears the sound from his own hand-held game apparatus 14b is notified that the player character P2 operated by him is close to the hidden item 116 and may experience a delightful feeling, and accordingly further concentrate on playing the game in order to try to find the position of the hidden item 116. On the other hand, the rest of the players hear the notification sound from the hand-held game apparatus 14b other than themselves, and are notified that the player other than themselves is about to obtain the hidden item 116, so they may become very frustrated. This makes it possible to perform a heated hunt for treasure. When the notification sound is a tone in common to the respective player characters it is difficult to know which player is close to the hidden item 116. Therefore, this causes other players to have a restless feeling, capable of boosting the game play.

Figure 6:
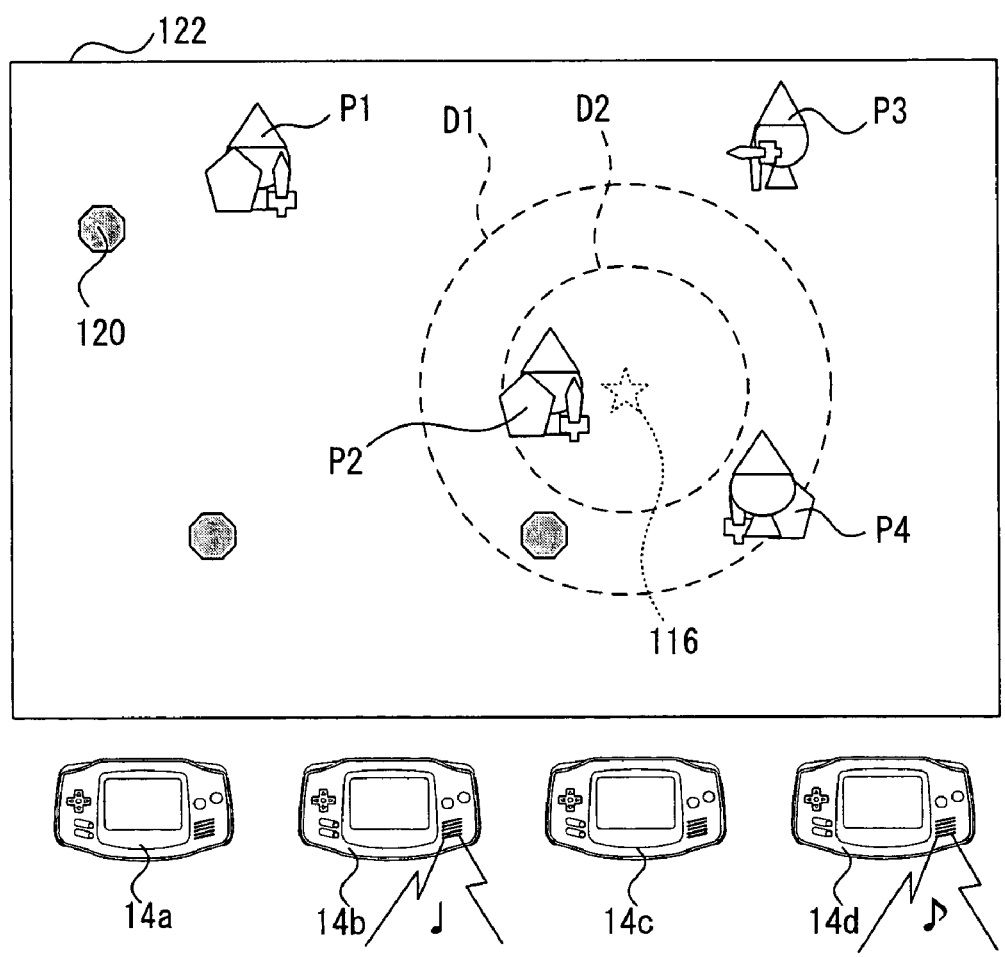
FIG. 6 is an illustrative view showing another example of a display screen and a manner of a sound outputs for that screen.

FIG. 6 shows one example of a display screen when the game further proceeds from a state of FIG. 5, and a state of a sound output of the respective hand-held game apparatuses 14 at that time. On a display screen 122 in FIG. 6, the player character P2 exists within the range of the nearby distance from the hidden item 116 (the area circled by the dashed line D2 in FIG. 6) closer to the hidden item than in the short distance range. Accordingly, a notification sound indicative of being closer to the hidden item 116 is output from the speaker 30 of the hand-held game apparatus 14b operating the player character P2. Also, in FIG. 6, the player character P4 exists within the range of short distance from the hidden item 116, and therefore, a notification sound indicative of existing within a short distance from the hidden item 116 is output from the speaker 30 of the hand-held game apparatus 14d operating the player character P4.

Thus, the notification sound is changed depending on the distance from the hidden item 116, and therefore, the player who is notified can know the extent to which his player object is close to or away from the hidden item. On the other hand, the other players can know whether the player other than themselves is close to or away from the hidden item. Thus, with respect to the other players, the notification sound instills a restless feeling or a sense of security caused by being aware of a little delay. Therefore, direction is performed on the search for the non-displayed item such that the players are moved from enjoyment or restlessness by sound, capable of increasing a level of enjoinment and/or sense of accomplishment.

Figure 7:
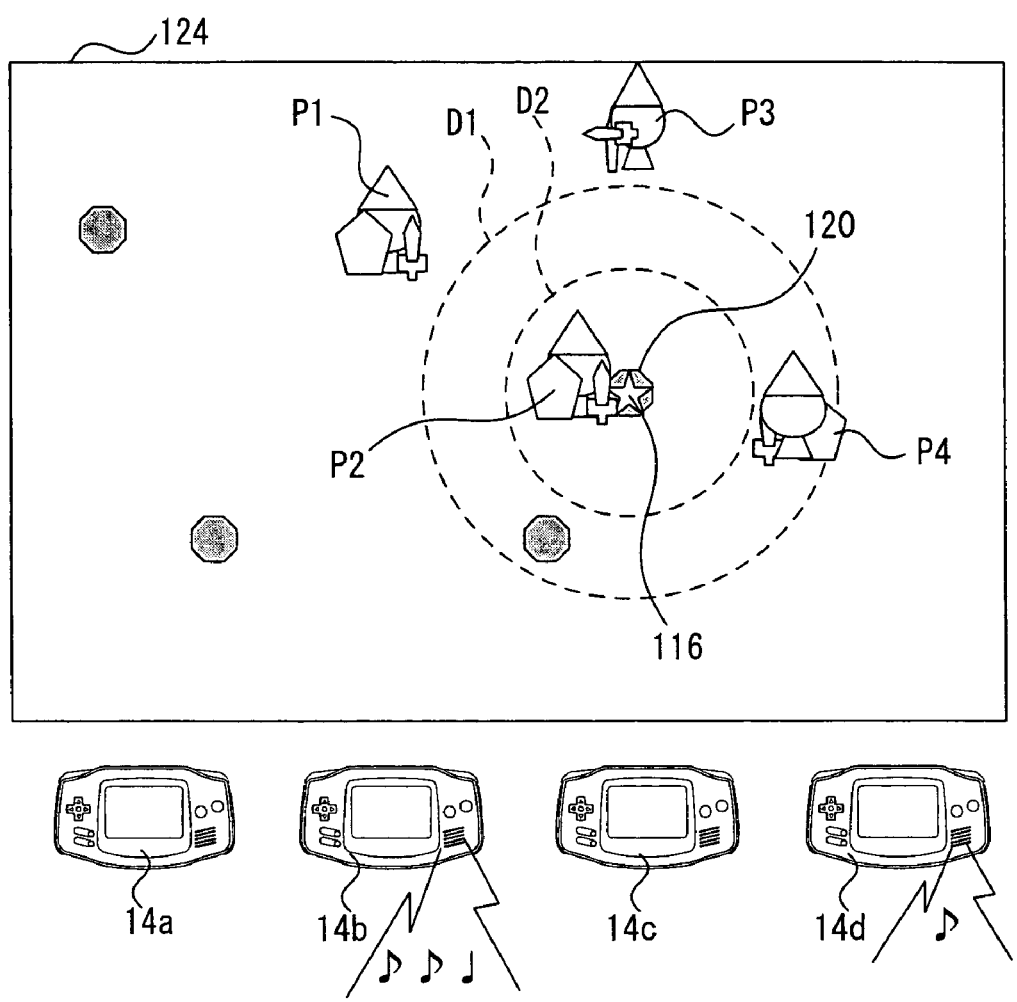
FIG. 7 is an illustrative view showing another example of a display screen and a manner of a sound output for that screen.

FIG. 7 shows one example of a display screen when the game further proceeds from a state of FIG. 6, and a sound output state of the respective hand-held game apparatuses 14 at that time. On a display screen 124 in FIG. 7, the player character P2 digs a hole 120 at the arrangement position of the hidden item 116, and finally finds the hidden item 116. By this find, the hidden item 116 is displayed on the display screen 124. Thereafter, if the position of the player character P2 is equal to the place where the found hidden item 116 is obtainable (e.g., the arrangement position of the hidden item 116 or its nearby position), the player character P2 obtains the hidden item 116. Then, a notification sound indicative of obtaining the hidden item 116 is output from the speaker 30 of the hand-held game apparatus 14b that takes charge of operating the player character P2.

Thus, the image of the hidden item 116 is displayed only after the hidden item 116 is found, and therefore, the players can know which player is about to obtain the hidden item 116 only when the hidden item 116 is finally found or obtained as a result of playing the game with a restless feeling, capable of bringing the end of the hidden item searching game to a climax.

Furthermore, in this exemplary illustrative embodiment, the attribute of the hidden item 116 is stored in the item attribute data storing area 92, and therefore, with reference to the attribute data after the item is obtained or found, a game processing according to the attribute of the obtained item is executed to develop the game after obtaining or finding the item in various ways. If the attribute of the hidden item 116 is money, for example, money carried by the player character is increased by a predetermined amount while in a case of the various items, the item can be possessed, equipped, or utilized by the player character.

Alternatively, the attribute of the obtained hidden item 116 is an extra game for hand-held game apparatus, a program and data for extra game are transmitted to only the hand-held game apparatus 14 operating the player character who obtains the hidden item to allow the player to play the extra game in only the hand-held game apparatus 14. In this case, the player who obtains the hidden item can play the special game such as finding another item, and so forth while viewing the display screen displayed on the LCD 32 of the hand-held game apparatus 14 at hand that cannot be seen from the other players, thereby, capable of proceeding the game with a delightful feeling and a sense of superiority because the player has a further feature. On the other hand, the other players proceed through the game with a restless, frustrated feeling because the player other than themselves can play the secret game.

Figure 8:
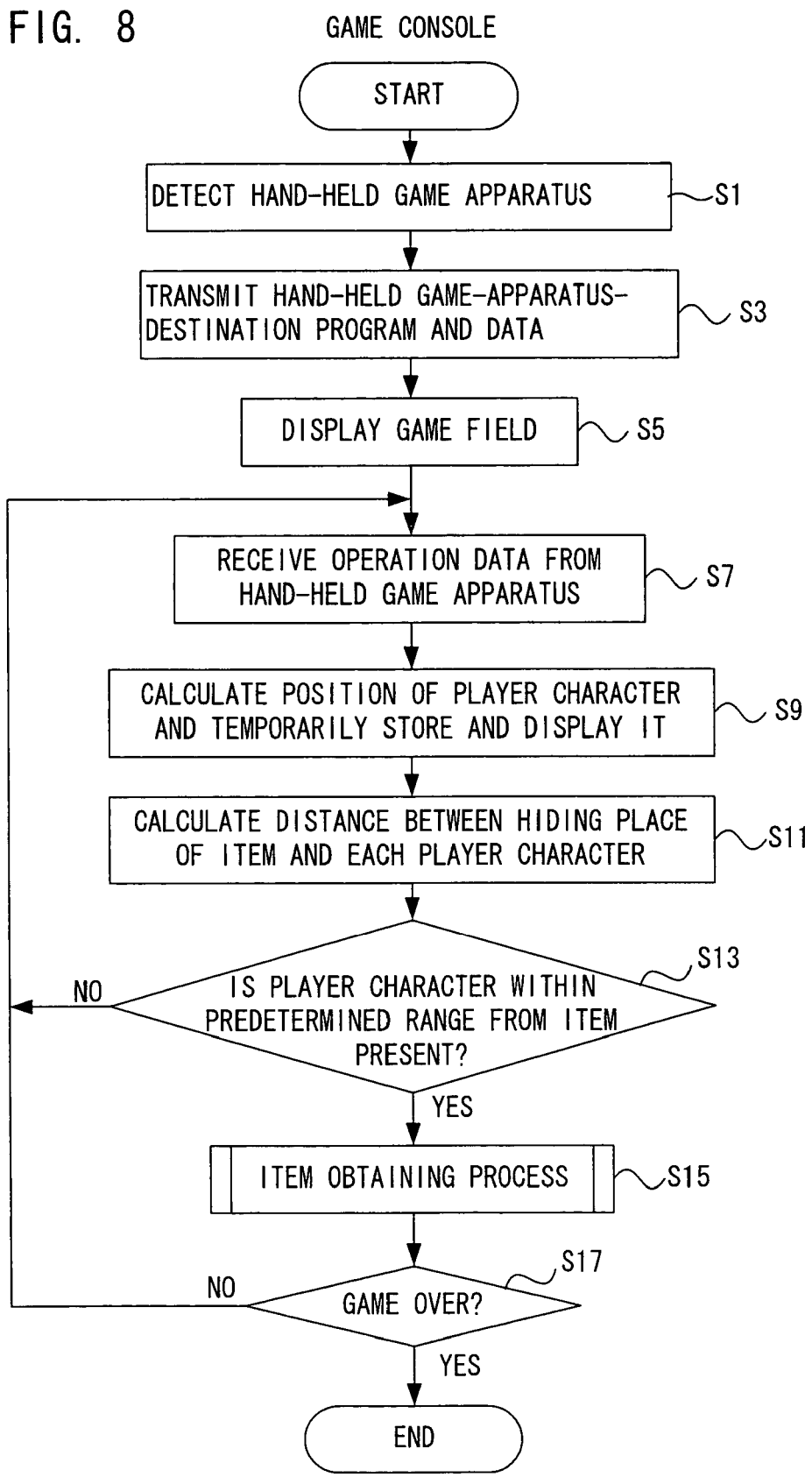
FIG. 8 is a flowchart showing one example of an operation of the game console in FIG. 1 exemplary illustrative embodiment.

FIG. 8 shows one example of an operation of the game console 12 in the game system 10. When starting the game, necessary programs and data are loaded from the optical disk 18 to the predetermined area of the RAM 38, and stored according to the memory map in FIG. 3, for example. In a first step S1 in FIG. 8, the CPU 36 of the game console 12 detects the hand-held game apparatuses 14 connected thereto. Next, in step S3, the CPU 36 transmits the hand-held game apparatus destination programs and data to each of the detected hand-held game apparatus 14. The programs and data to be transmitted include, for example, a program for making the hand-held game apparatus 14 serve as the operating means for the game console 12, a program for outputting a notification sound according to the instruction, sound data of the notification sound, etc. The programs and data are, for example, stored in the WRAM 48 of the hand-held game apparatus 14 according to the memory map in FIG. 4.

Then, in step S5, the CPU 36 generates a game field on the basis of the game field data, etc. by use of the image processing unit 42 to display the display screen on the monitor 26. In step S7, the CPU 36 requests each hand-held game apparatus 14 to transmit the operation data, receives the operation data from each hand-held game apparatus 14, and temporarily stores it in the operation data temporary storing buffer area 94. In step S9, the CPU 36 calculates a position of each player character on the basis of each operation data, temporarily stores each position data in the player character position data area 86, and generates in the game field an image of each player character on the basis of the position data of each player character, the player image data, etc. by use of the image processing unit 42 to display the display screen on monitor 26.

Then, in step S11, the CPU 36 calculates distances between the arrangement position of each hidden item and each player character in the game field on the basis of the item position data, the player character position data, etc. On the basis of the calculated distance, the CPU 36, in a step S13, determines whether or not the player character exists within the range of a predetermined distance from each hidden item. For example, as shown in FIG. 5, it is determined whether or not the player character having a data value being lower than a distance defined by the short distance from the hidden item 116 represented by the dashed line D1 exists. If "NO" is the result of step S13 (e.g., if no player characters reach the short distance from the hidden item), the process returns to step S7 to repeat this processing.

On the other hand, if "YES" is the result of step S13, that is, if any one of the player characters exists in the short distance from the hidden item, the CPU 36 executes an item obtaining process in step S15. According to the item obtaining process, depending on the distance between the player character existing in the short distance and the hidden item, a predetermined notification sound is output from the hand-held game apparatus 14 that takes charge of the operation of the player character. The detail of the item obtaining process is described later.

Then, in step S17, the CPU 36 determines whether or not the game is over, and if "NO" is the result, the process returns to step S7 to repeat this processing, while if "YES" is the result, the game is ended.

Figure 9:
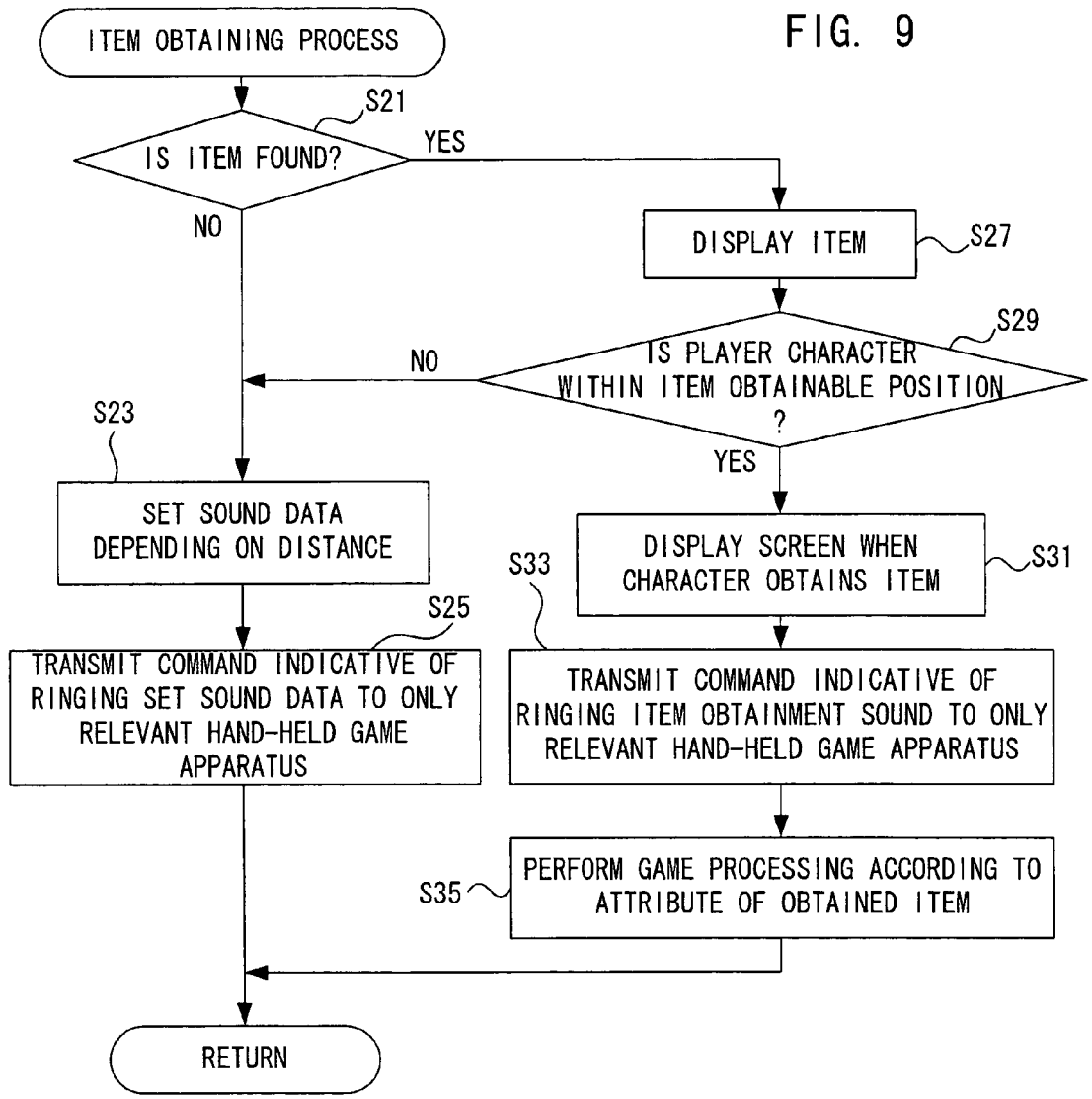
FIG. 9 is a flowchart showing one example of an item obtaining process in FIG. 8.

FIG. 9 shows a detailed operation of the item obtaining process in step S15 of FIG. 8. The CPU 36 determines whether or not the hidden item is found in a first step S21 in FIG. 9. For example, as shown in FIG. 7, if the hole 120 is dug at the arrangement position of the hidden item 116, this means that the hidden item 116 is found.

If "NO" is the result of step S21, that is, if the hidden item has not yet been found, the CPU 36 sets the sound data to be emitted depending on the distance between the player who is determined to exist in the range of the predetermined distance and the hidden item in succeeding step S23. For example, as shown in FIG. 5, if the distance data value between player character P2 and the hidden item 116 is larger than the distance data value defining the nearby distance represented by the dashed line D2, the sound data for reproduction when being a short distance away is set. As shown in FIG. 6, for example, if the distance data value between the player character P2 and the hidden item 116 corresponds to the nearby distance represented by the dashed line D2, the sound data for reproduction when being close to the item is set.

Then, in step S25, the CPU 36 transmits a command for providing an instruction to emit the set sound data only to the hand-held game apparatus 14 that takes charge of operating the relevant player character. The command includes an identifier, and so on for designating the set sound data. The handheld game apparatus 14 receiving the command outputs the notification sound from the speaker 30 on the basis of the set sound data. For example, as shown in FIG. 5, if the player character P2 exists within the range of the short distance, the notification sound indicative of being within the short distance is output from the hand-held game apparatus 14b while as shown in FIG. 6, the player character P2 exists within the range of the nearby distance, the notification sound indicative of being closer to the hidden item is output from the hand-held game apparatus 14b. After completion of step S25, the item obtaining process is ended, and the process is returned to step S17 in FIG. 8.

On the other hand, if "YES" is the result of step S21, that is, if the hidden item is found, the CPU 36 generates in the game field the image of the hidden item on the basis of the item position data, item image data, etc. by use of the image processing unit 42, and displays the display screen on the monitor 26 in succeeding step S27.

Then, in step S29, the CPU 36 determines whether or not the player character that is determined to exist within the range of the predetermined distance exists in a position where the hidden item is obtainable. As shown in FIG. 7, for example, it is determined whether or not the position of the player character P2 is equal to the arrangement position of the hidden item 116 or its periphery. If "NO" is the result of step S29, that is, if the hidden item cannot be obtained, the process proceeds to step S23 to cause the relevant hand-held game apparatus 14 to output a sound depending on the distance from the hidden item in the above-described manner.

On the other hand, if "YES" is the result of step S29, that is, if the position of the relevant player character is equal to the position where the hidden item is obtainable, the CPU 36 generates a screen at a time the player character obtains the hidden item by use of the image processing unit 42, and displays it on the monitor 26 in succeeding step S31. Then, in step S33, the CPU 36 sets the sound data for reproduction when obtaining the item as the sound data to be emitted, and transmits to only the hand-held game apparatus 14 operating the player character who obtains the item a command indicative of ringing the item obtaining sound. The hand-held game apparatus 14 that has received the command, as shown in FIG. 7, for example, outputs from the speaker 30 the notification sound on the basis of the sound data for reproduction when obtaining the item.

In step S35, the CPU 36 of the game console 12 executes game processing according to the attribute of the obtained item on the basis of the item attribute data. For example, if the attribute of the item is money, the money carried by the player character is increased while in a case that the attribute is various items, the player character is allowed to possess, equip or use the item. Alternatively, if the attribute is an extra game for hand-held game apparatus, the CPU 36 loads into the RAM 38 the programs and data for playing the extra game from the optical disk 18, and transmits the programs and data to only the relevant hand-held game apparatus 14 so as to allow the player who operates the hand-held game apparatus 14 to play the extra game. It is noted that in response to the transmission, the CPU 46 of the hand-held game apparatus 14 receives the programs and data of the extra game, executes the game processing according to the programs, the operation data from the operating switch 28, etc., and displays the game image of the extra game on the LCD 32. After completion of step S35, the item obtaining process is ended, and the process returns to step S17 in FIG. 8.

FIG. 10 shows one example of a timing diagram of a communication between the game console 12 and the hand-held game apparatus 14 in this exemplary illustrative game system 10. First, the CPU 36 of the game console 12 detects the hand-held game apparatuses 14 connected thereto in step S41. The CPU 46 of the hand-held game apparatus 14 detects capability of data exchange in step S61, and establishes a communication between the game console 12 and each hand-held game apparatus 14.

Then, the CPU 36 of the game console 12 transmits to each hand-held game apparatus 14 hand-held-game-destination-data and programs in step S43. In response thereto, the CPU 46 of the hand-held game apparatus 14 receives the hand-held game-destination-data and programs, and stores it in the predetermined area of the WRAM 48.

Thereafter, the CPU 46 of the hand-held game apparatus 14 generates operation data on the basis of the input data from the operating switch 28 in step S65, and stores it in the operation data temporarily storing buffer area 112. On the other hand, the CPU 36 of the game console 12 transmits to each hand-held game apparatus 14 a command for requesting the operation data in step S45. In response thereto, the CPU 46 of the hand-held game apparatus 14 receives the command for requesting the transmission of the operation data in step S67, and transmits the operation data to the game console 12 in step S69.

In response to the transmission, the CPU 36 of the game console 12 receives the operation data transmitted from each hand-held game apparatus 14, and stores it in the operation data temporary storing buffer area 94 in step S47. Then, the CPU 36 executes the game processing in succeeding step S49. In step S49, as described above, the CPU 36 calculates a position of each player character on the basis of each operation data to display each player character, and calculates a distance between each player character and the hidden item. Then, in step S51, the CPU 36 sets the sound data to be emitted in the hand-held game apparatus 14 that takes charge of operating the player character on the basis of the distance between each player character and the hidden item if the player character exists within the range of the predetermined distance from the hidden item. Then, in step S53, the CPU 36 transmits only to the hand-held game apparatus 14 from which the sound data has to be emitted a command for providing an instruction to output the set sound data. Then, in step S55, the CPU 36 repeats the processing from step S45 onward until the game is over, and ends the process when the game is over.

On the other hand, in correspondence to the transmission of the sound output command in step S53, the CPU 46 of the hand-held game apparatus 14 receives the sound output command in step S71. Then, in step S73, the CPU 46 reads-out the sound data designated by the command from the sound data area 110 to generate the data of the notification sound to be output based on the sound data, and outputs the notification sound from the speaker 30 by utilizing the sound unit 52. Then, the CPU 46 repeats the processing from step S65 onward until the game is over in step S75, and ends the processing when the game is over.

It is noted that the notification sound has a tone in common with each of the attributes or the types of the hidden item in the above-described exemplary illustrative embodiments. However, by preparing the sound data for each attribute or each type of item, a different notification sound may be output in correspondence with the attribute or the type of the item. In this case, the player can presume the type of the hidden item before finding or obtaining it by hearing the difference between the notification sounds. When it is presumed that the item is not one which he wants, for example, by postponing the obtainment of the item to search another place, and so forth, it is possible to search for only the item he wants. This makes it possible to search for the item efficiently and makes the competition with the other players intense and heated. The value indicative of the predetermined distance for determining whether or not the sound is output depending on the attribute or the type data of the hidden item may be set to a different value.

Furthermore, in each of the above-described exemplary illustrative embodiments, although the hidden item is a non-displayed item fixedly arranged at a predetermined position in the game field, the hidden non-displayed item may be an item (invisible non player object, etc.) moving in the game field.

Furthermore, in each of the above-described exemplary illustrative embodiments, the hand-held game apparatus 14 that is provided with the LCD 32, etc. and is able to function as a singly game apparatus is utilized as an operating means for the game console 12. However, the operating means may be a general game controller that applies the operation signal from operating switch 28 to the game console 12, and is further provided with a sound outputting means such as a speaker, a sound processing circuit, etc. In this case, the sound generation programs, the sound data, etc. stored in the WRAM 48 of the hand-held game apparatus 14 is stored in the RAM 38 of the game console 12. Then, when the player character exists within the range of the predetermined distance from the hidden item, the CPU 36 selectively processes the predetermined sound data on the basis of the distance between the player character and the hidden item to generate the notification sound, and applies it to the sound processing circuit of the relevant controller to output the notification sound from the speaker.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game system for use with an associated display apparatus and configured to allow a plurality of players to play a game in which a plurality of displayed player characters search for an invisible non-displayed item, comprising:

a game console; and a plurality of hand-held game apparatuses, each including at least a controller with which the plurality of players can play a game and a sound output;

wherein said game console includes:

a processor for performing game processing in response to inputs from said controllers of said plurality of hand-held game apparatuses;

display programmed logic circuitry for displaying a result processed by said processor as an image on said display apparatus;

a field generator for generating a game field where at least one non-displayed item is located;

player character display programmed logic circuitry for displaying, according to inputs from said controllers of said plurality of hand-held game apparatuses, said plurality of player characters each corresponding to one of the hand held-game apparatuses, respectively;

non-displayed item data storage programmed logic circuitry for storing at least a position of said non-displayed item in said game field;

player position storage programmed logic circuitry for temporarily storing positions of said plurality of player characters in said game field that are operated by the plurality of controllers respectively;

a distance calculator for calculating a distance between said non-displayed item and said player character on the basis of a position of said non-displayed item and a position of said player character; and instructing programmed logic circuitry for instructing, when it is determined that the position of at least one player character falls within a predetermined range from the position of said non-displayed item on the basis of the distance obtained by said distance calculator, the hand held game apparatus controlling said at least one player character to output a notification sound; wherein said sound outputs of said hand-held game apparatuses output the notification sound when receiving the instruction by said instructing programmed logic circuitry and the sound is the same sound regardless of which particular player character's position fell within the predetermined range.

2. The game system according to claim 1, wherein said instructing programmed logic circuitry instructs said hand-held game apparatuses to emit the notification sound that is changeable depending on the distance obtained by said distance calculator.

3. The game system according to claim 1, wherein said game console further includes non-displayed item displaying programmed logic circuitry for displaying, after the non-displayed item is found, an image of said non-displayed item on said display apparatus.

4. The game system according to claim 1, wherein said non-displayed item data storage programmed logic circuitry further stores type data of said non-displayed item.

5. A game apparatus for a plurality of player characters displayed on a display to search for an invisible non-displayed item, comprising:

a plurality of controllers;

a sound output provided to each of said plurality of controllers;

a processor for performing game processing in response to an input from said plurality of controllers;

display programmed logic circuitry for displaying a result processed by said processor as an image;

a field generator for generating a game field where the at least one non-displayed item is arranged;

non-displayed item data storage programmed logic circuitry for storing at least a position of said non-displayed item in said game field;

player position storage programmed logic circuitry for temporarily storing positions of said plurality of player characters in said game field that are operated by said plurality of controllers respectively;

a distance calculator for calculating a distance between said non-displayed item and each of said player characters on the basis of a position of said non-displayed item and a position of each player character; and a notification sound generator for generating, when the position of at least one player character falls within a predetermined range from the position of said non-displayed item, at least one kind of notification sound on the basis of the distance obtained by said distance calculator, wherein said sound outputs of the controller controlling the at least one player character outputs the notification sound generated by said notification sound generator, said sound being the same sound regardless of which player character's position fell within the predetermined range.

6. The game apparatus according to claim 5, wherein said notification sound generator changes the notification sound depending on the distance obtained by said distance calculator.

7. The game apparatus according to claim 5, further including non-displayed item displaying programmed logic circuitry for displaying, after said non-displayed item is found, an image of said non-displayed item on said display.

8. The game apparatus according to claim 5, wherein said non-displayed item data storage programmed logic circuitry further stores type data of said non-displayed item.

9. A storage medium storing a game program that causes a game apparatus including a plurality of controllers, a sound output provided to each of said plurality of controllers, a processor for performing game processing in response to input from said plurality of controllers, and display programmed logic circuitry for displaying a result processed by said processor as an image to function as a game for searching for an invisible non-displayed item by a plurality of player characters simultaneously displayed on a display, said game program causing a computer of said processor to execute following steps of:

a field generating step of generating a game field where at least one non-displayed item is arranged;

a non-displayed item data storing step of storing at least a position of said non-displayed item in said game field;

a player position storing step of temporarily storing positions of said plurality of player characters in said game field that are operated by a plurality of controllers;

a distance calculating step of calculating a distance between said non-displayed item and each of said player characters on the basis of a position of said non-displayed item and a position of each of said player characters;

a notification sound generating step of generating, when the position of at least one player character falls within a predetermined range from the position of said non-displayed item, at least one kind of notification sound on the basis of the distance obtained by said distance calculating step; and a sound outputting step of causing the sound output of the controller controlling the at least one player character to output the notification sound generated by said notification sound generating step, said sound being the same sound regardless of which player character's position fell within the predetermined range.

10. The storage medium according to claim 9, wherein said notification sound generating step changes the notification sound depending on the distance obtained by said distance calculating step.

11. The storage medium according to claim 9, wherein said game program further includes a non-displayed item displaying step of displaying, after the non-displayed item is found, an image of said non-displayed item on said display.

12. The storage medium according to claim 9, wherein said non-displayed item data storing step further stores type data of said non-displayed item.

\* \* \* \* \*